United States Patent
Wang et al.

(10) Patent No.: US 8,294,542 B2
(45) Date of Patent: Oct. 23, 2012

(54) MAGNETIC SUSPENSION DEVICE

(76) Inventors: XiaoBing Wang, ShenZhen (CN);
LiangQing Li, ShenZhen (CN)

( * ) Notice: Subject to any disclaimer, the term of this patent is extended or adjusted under 35 U.S.C. 154(b) by 0 days.

(21) Appl. No.: 13/061,564

(22) PCT Filed: Dec. 12, 2009

(86) PCT No.: PCT/CN2009/075676
§ 371 (c)(1),
(2), (4) Date: Mar. 1, 2011

(87) PCT Pub. No.: WO2010/075737
PCT Pub. Date: Jul. 8, 2010

(65) Prior Publication Data
US 2011/0248807 A1    Oct. 13, 2011

(30) Foreign Application Priority Data
Dec. 31, 2008    (CN) ...................... 2008 2 0235791 U

(51) Int. Cl.
*H01F 7/00*    (2006.01)

(52) U.S. Cl. .......................... 335/296; 335/285; 361/144
(58) Field of Classification Search .......... 335/209–306; 361/144
See application file for complete search history.

(56) References Cited

U.S. PATENT DOCUMENTS 5,168,183 A * 12/1992 Whitehead ................. 310/12.09
7,501,922 B2 * 3/2009 Kazadi ........................... 335/306
2006/0044094 A1 * 3/2006 Davis et al. .................... 335/220
* cited by examiner

*Primary Examiner* — Bernard Rojas
(74) *Attorney, Agent, or Firm* — Jackson IPG PLLC

(57) ABSTRACT

A magnetic suspension device comprises a magnetic base and a suspension body. The suspension body is suspended above the magnetic base. The suspension body is provided with a receiving coil and at least one luminous body. The magnetic base is provided with a transmitting coil. The transmitting coil transmits an AC signal to the receiving coil. The receiving coil converts the AC signal transmitted by the transmitting coil into electric energy and supplies the electric energy to the luminous body for emitting light. In the magnetic suspension device of the present invention, the transmitting coil is arranged at the magnetic base, and the receiving coil is arranged in the suspension body. Wireless power transmission is realized through the transmitting coil and the receiving coil, so, the luminous body arranged on the suspension body can emit light without any cell and external power supply. This wireless power transmission method can avoid the impact on the operation of the suspension body, which not only can ensure the favorable suspension effect of the suspension body, but also can make the suspension body emit light. The magnetic suspension device has a very good decorative effect, and can be widely used in fields such as toys, ornaments, advertisements, and so on.

9 Claims, 3 Drawing Sheets

MAGNETIC SUSPENSION DEVICE

FIELD OF THE INVENTION

The present invention involves the electromagnetic technical field, particularly involves a magnetic suspension device, of which the suspension body is provided with a luminous body to make the suspension body to have luminous effect.

BACKGROUND OF THE INVENTION

A magnetic suspension device has a good decorative effect, and can be widely used in fields such as toys, gifts, advertisements, and so on. A conventional magnetic suspension device generally comprises a magnetic base and a suspension body. An electromagnet mounted inside the magnetic base generates a magnetic repulsion to the suspension body (a magnet is mounted inside the suspension body). The magnetic repulsion is utilized to balance the gravity of the suspension body, so as to make the suspension body to be suspended and rotated.

For making the magnetic suspension device to have a visually aesthetic effect, a luminous body is mounted to the suspension body, thereby making the suspension body to have a visually aesthetic effect by the projecting of light. However, a cell or an external power supply wire is needed to continuously supply the electric power for emitting light to the luminous body conventionally mounted on a circuit board. While using an external power supply wire, the movable area of the suspension body is limited by the length of the wire, which makes the suspension body is not convenient or aesthetic to be used. It can avoid limiting the movable area of the suspension body by replacing the power supply wire with a cell to supply the electric power, but the weight of the suspension body is increased, so that the suspension effect is affected, or even the suspension can not be suspended. Furthermore, if the cell runs out of power, the cell should be changed, which is not convenient in use. So, the method of supplying electric power to the luminous body is necessary to be improved.

SUMMARY OF THE INVENTION

The present invention provides a magnetic suspension device that can realize suspending and rotating the suspension body which is provided with a luminous body. Electric energy is transmitted to the luminous body by wireless method to make the luminous body emit light, thereby making the suspension body to have luminous effect.

To achieve the above mentioned object, a magnetic suspension device of the present invention comprises a magnetic base and a suspension body. The suspension body is suspended above the magnetic base. The suspension body is provided with a receiving coil and at least one luminous body. The magnetic base is provided with a transmitting coil. The transmitting coil transmits an AC signal to the receiving coil. The receiving coil converts the AC signal transmitted by the transmitting coil into electric energy and supplies the electric energy to the luminous body for emitting light.

Wherein, the suspension body is provided with a plurality of luminous bodies; the luminous bodies adopt LED lamps which are arranged inside the suspension body or on the suspension body, and are connected to the receiving coil by electric connection.

The suspension body is a hollow sphere, an ornament, a toy, a lamp or a furnishing.

A permanent magnet is arranged inside the suspension body, and the permanent magnet is arranged symmetrically around the barycenter vertical of the suspension body.

A transmitting circuit board is arranged inside the magnetic base, and the transmitting circuit board is arranged correspondingly to the transmitting coil.

An annular ferrite is arranged inside the magnetic base; a plurality of suspension system coils, a plurality of magnetic heads embedded in the suspension system coils, and a magnetic suspension circuit board are arranged inside the magnetic base. The magnetic suspension circuit board is used to control the change of the magnetism of the suspension system coils and the magnetic heads. Besides, a system sensor (used to control the suspension of the suspension body) and a central sensor (used to control the work of the system sensor) are arranged inside the magnetic base.

The side of the magnetic base is provided with a through hole, and a power converter is arranged at the through hole for connecting with an external power supply to provide electricity to the magnetic suspension circuit board and the transmitting circuit board.

The present invention has the following advantages. The transmitting coil is arranged at the magnetic base, the receiving coil is arranged in the suspension body, wireless power transmission is realized through the transmitting coil and the receiving coil, whereby the luminous body arranged on the suspension body can emit light without any cell and external power supply. This wireless power transmission method can avoid the impact on the operation of the suspension body. The favorable suspension effect of the suspension body is ensured. The suspension body can emit light, and so the decorative effect is very good. The magnetic suspension device can be widely used in fields such as toys, ornaments, advertisements and so on.

The characteristic and the technical solution of the present invention are best understood from the following detailed description with reference to the accompanying figures, but the figures are only for reference and explaining, not to limit the scope of the invention.

DESCRIPTION OF THE PREFERRED EMBODIMENT

Figure 1:
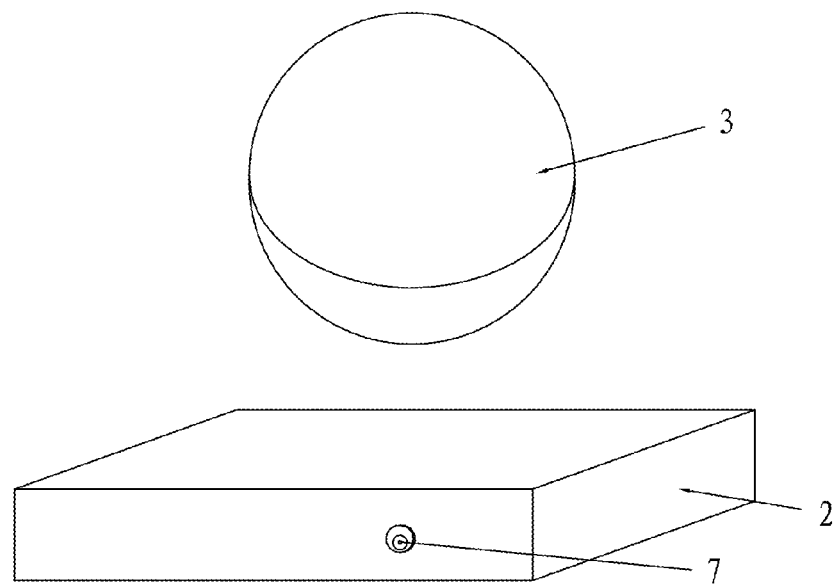
FIG. 1 is an assembled view of a magnetic suspension device of the present invention.
Figure 2:
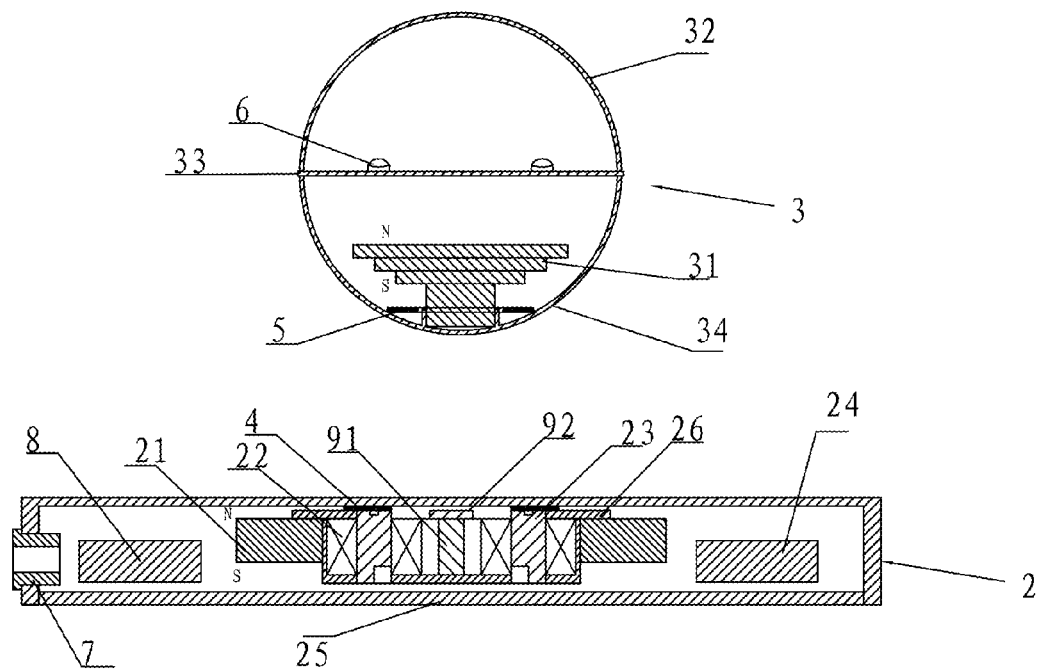
FIG. 2 is a sectional view of FIG. 1.

Hereinafter, the present invention is described detailedly with reference to the accompanying figures.

Referring to FIGS. 1-4, a magnetic suspension device of the present invention comprises a magnetic base 2 and a suspension body 3. Wherein, the suspension body 3 is suspended above the magnetic base 2. The magnetic base 2 is provided with a transmitting coil 4. The suspension body 3 is provided with a receiving coil 5 and at least one luminous body 6. The transmitting coil 4 transmits an AC signal to the receiving coil 5. The receiving coil 5 converts the AC signal transmitted by the transmitting coil 4 into electric energy and supplies the electric energy to the luminous body 6 for emitting light.

The suspension body 3 is suspended by the balance of the magnetic repulsion between the magnetic base 2 and the suspension body 3. The suspension body 3 comprises at least one permanent magnet arranged at the barycenter vertical of the suspension body 3 or around the barycenter vertical symmetrically. The gravity of the suspension body 3 can be balanced by the magnetic repulsion produced between the magnetic base 2 and the at least one permanent magnet, so that the suspension body 3 is suspended at the predetermined reference position above the magnetic base 2. In the present embodiment, a permanent magnet 31 is arranged inside the suspension body 3. The permanent magnet 31 is arranged symmetrically around the barycenter vertical of the suspension body 3. The permanent magnet 31 is an assembly of magnets, of which the lower end is a cylindrical magnet 311, and the upper end is several overlapped circular magnets. A ferrite 21 is arranged inside the magnetic base 2, and the ferrite 21 is an annular permanent magnet. The ferrite 21 interacts with the permanent magnet 31, so as to balance the gravity of the suspension body 3 and not to be overturned vertically. Besides, four suspension system coils 22, four magnetic heads 23 embedded in the four suspension system coils 22, a magnetic suspension circuit board 24, a system sensor 91 and a central sensor 92 are arranged inside the magnetic base 2. After the magnetic suspension circuit board 24 is electrified, it can control the change of the magnitude and direction of the magnetism of the suspension system coils 22 and magnetic heads 23, thereby making the permanent magnet 31 to move relatively. For example, the permanent magnet 31 is made to rotate around its barycenter vertical, so as to make the suspension body 3 to rotate above the magnetic base 2; the system sensor 91 is used to sense the position of the suspension body 3, thereby controlling the suspension system coils 22 to generate the electromagnetic force to suspend the suspension body 3. The central sensor 92 is arranged correspondingly to the system sensor 91, which is used to sense whether the suspension body 3 is located at the suspension position above the magnetic base 2. If the suspension body 3 is not located at the suspension position, the system sensor 91 and the suspension system coils 22 will stop working. The magnetic suspension circuit board 24, the system sensor 91 and the central sensor 92 can be achieved via the conventional art.

The lumination of the luminous body 6 is achieved by transmitting and converting the signals of the transmitting coil 4 inside the magnetic base 2 and the receiving coil 5 inside the suspension body 3. A transmitting circuit board 8 is also arranged inside the magnetic base 2, and the transmitting circuit board 8 is arranged correspondingly to the transmitting coil 4. The transmitting circuit board is used to transmit signals to the transmitting coil 4 and then the signals are transmitted to the receiving coil 5 via the transmitting coil 4. Specifically, the transmitting circuit board 8 converts the energy of the power supply into AC signals. The AC signals are transmitted to the transmitting coil 4 by the method of induction. And the transmitting coil 4 transmits the AC signals to the receiving coil 5. Then the receiving coil 5 converts the AC signals into electric power to be provided to the luminous body 6 for emitting light, so that the suspension body 3 does not need power supply wires or cells. The transmitting circuit board 8 can be achieved via the conventional art.

Figure 3:
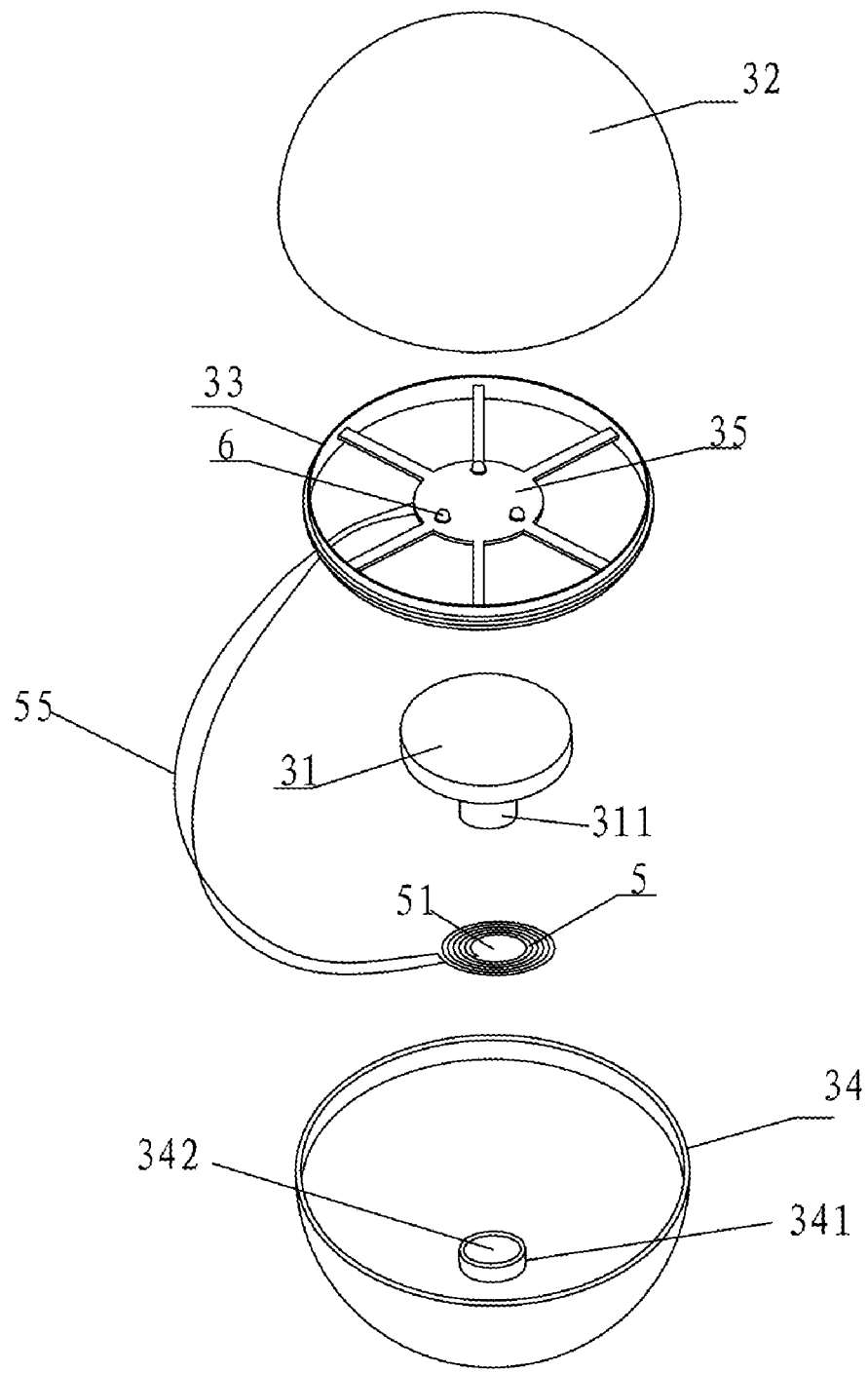
FIG. 3 is an exploded view of the suspension body in FIG. 1.

Referring to FIG. 3, in the present embodiment, the suspension body 3 is a hollow sphere, which is made of non-lighttight material. Three luminous bodies 6 are arranged in the suspension body 3, and the luminous bodies 6 adopt LED lamps. In an alternative embodiment, the luminous bodies 6 can also be mounted to the outer wall of the suspension body 3. Specifically, the suspension body 3 comprises an upper case 32, a lower case 34 and a mounting ring 33 arranged between the upper case 32 and the lower case 34. A mounting part 35 is arranged at the middle of the mounting ring 33, and the three luminous bodies 6 are mounted to the mounting part 35 and are connected to the receiving coil 5 via the connecting wire 55. The middle of the receiving coil 5 is provided with a through hole 51 corresponding to the cylindrical magnet 311 of the permanent magnet 31. The lower case 34 is provided with a fixing pillar 341 corresponding to the cylindrical magnet 311, and the middle of the fixing pillar 341 is provided with a fixing hole 342. The cylindrical magnet 311 passes through the through hole 51 of the receiving coil 5, and then is inserted into the fixing hole 342. The permanent magnet 31 is fixed at the lower end of the lower case 34. The receiving coil 5 is sleevingly arranged to the outer side of the cylindrical magnet 311.

Figure 4:
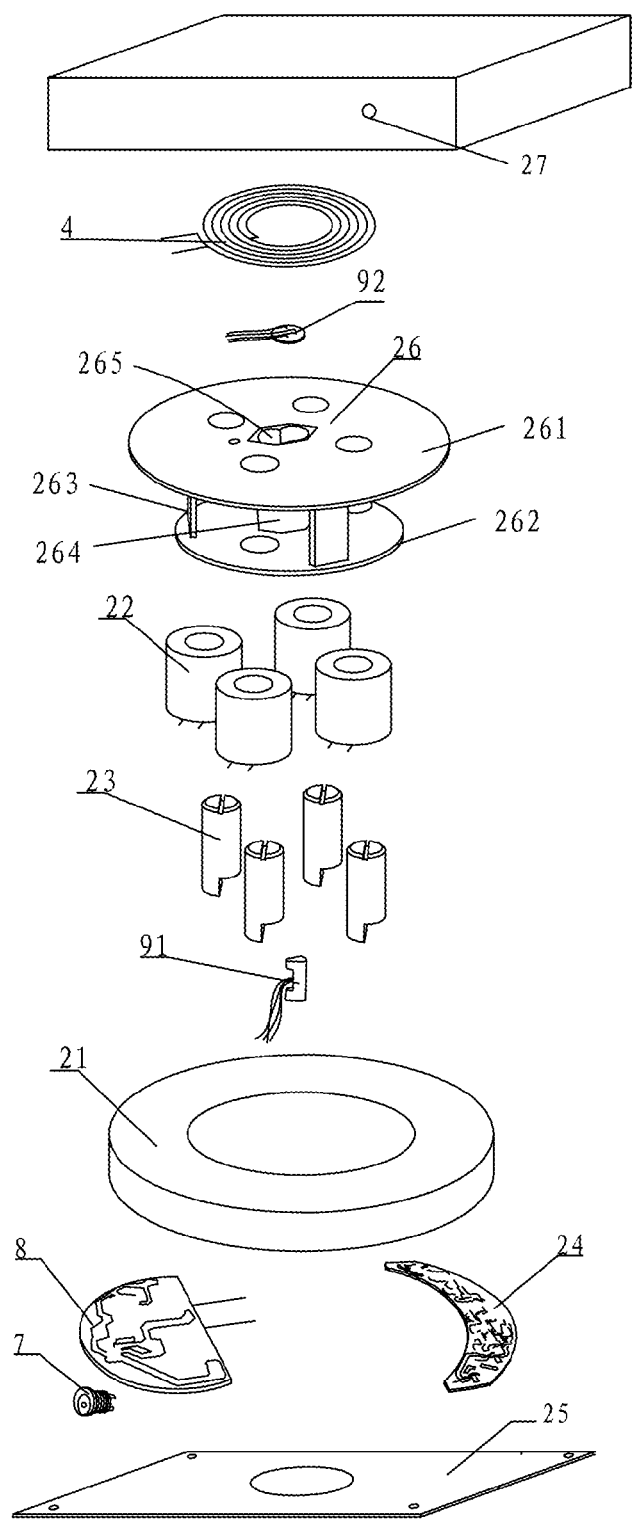
FIG. 4 is an exploded view of the magnetic base in FIG. 1.

Referring to FIG. 4, in the present embodiment, the magnetic base 2 is cuboid. The lower opening of the magnetic base 2 is provided with a base plate 25, which is convenient for installing internal components. The side of the magnetic base 2 is provided with a through hole 27, and a power converter 7 is arranged at the through hole 27. The power converter 7 is used for connecting with an external power supply (not shown in the figure) to provide electricity to the magnetic suspension circuit board 24 and the transmitting circuit board 8. Besides, a bracket 26 is arranged in the magnetic base 2. The bracket 26 comprises an upper mounting plate 261, a lower mounting plate 262, a plurality of connecting plates 263 connecting the upper mounting plate 261 and the lower mounting plate 262, and a mounting pillar 264 connecting the middle parts of the upper mounting plate 261 and the lower mounting plate 262. Wherein, the radial dimension of the upper mounting plate 261 is bigger than the lower mounting plate 262, and the middle of the mounting pillar 264 is provided with a containing hole 265. The magnetic suspension circuit board 24 and the transmitting circuit board 8 are arranged on the base plate 25, and are separately located at the two sides of the bracket 26. The ferrite 21 is sleevingly arranged to the outer side of the connecting plates 263. The system sensor 91 is contained in the containing hole 265, and the central sensor 92 is arranged at the upper end of the containing hole 265 correspondingly to the system sensor 91. The transmitting coil 4 is arranged at the upper end face of the upper mounting plate 261. The upper mounting plate 261 and the lower mounting plate 262 are respectively provided with four upper mounting holes 266 and four lower mounting holes 267 corresponding to the four magnetic heads 23. The four magnetic heads 23 are respectively sheathed in the four suspension system coils 22, and of which the two ends are respectively arranged in the four upper mounting holes 266 and four lower mounting holes 267.

Although the present invention has been described in detail with above mentioned embodiments, but it is not to limit the scope of the invention. The suspension body 3 is not limited to a hollow sphere, and it can also be an ornament (such as a craft candle), a toy (such as a small car), a lamp or a furnishing (such as a crystal tray), etc., which can be made according to the requirement. The receiving coil 5 can be mounted to every kind of suspension body 3. While the luminous bodies 6 are mounted inside the suspension body 3, the suspension body is required to be made of non-lighttight material. Of course, the luminous bodies 6 can also be arranged outside the suspension body 3. The lumination of the luminous bodies 6 is achieved by the transmitting coil 4 and the receiving coil 5 transmitting electric energy, so, the suspension body 3 needs no power supply wires or cells. The permanent magnet 31 can be any assembly of permanent magnets that are arranged at the barycenter vertical of the suspension body 3 or around the barycenter vertical symmetrically. The ferrite 21 inside the magnetic base 2 is not limited to a single annular permanent magnet, and it can also be an assembly of an elliptic and several cylindrical permanent magnets, etc.

In the magnetic suspension device of the present invention, the transmitting coil is arranged at the magnetic base, and the receiving coil is arranged in the suspension body. Wireless power transmission is realized through the transmitting coil and the receiving coil, so, the luminous body arranged on the suspension body can emit light without any cell or external power supply. This wireless power transmission method can avoid the impact on the operation of the suspension body, which not only can ensure the favorable suspension effect of the suspension body, but also can make the suspension body emit light. The magnetic suspension device has a very good decorative effect, and can be widely used in fields such as toys, ornaments, advertisements, and so on.

Although the present invention has been described in detail with above said embodiments, but it is not to limit the scope of the invention. So, all the modifications and changes according to the characteristic and spirit of the present invention, are involved in the protected scope of the invention.

What is claimed is:

1. A magnetic suspension device comprising a magnetic base and a suspension body; the suspension body being suspended above the magnetic base, the suspension body being provided with a receiving coil and at least one luminous body; the magnetic base being provided with a transmitting coil, the transmitting coil transmitting an AC signal to the receiving coil; the receiving coil converting the AC signal transmitted by the transmitting coil into electric energy and supplying the electric energy to the luminous body for emitting light, wherein the suspension body is provided with a plurality of luminous bodies; the luminous bodies adopt LED lamps which are arranged inside the suspension body or on the suspension body, and are connected with the receiving coil by electric connection, wherein a permanent magnet is arranged inside the suspension body, and the permanent magnet is arranged symmetrically around the barycenter vertical of the suspension body, wherein the suspension body comprises an upper case, a lower case and a mounting ring arranged between the upper case and the lower case; a mounting part is arranged at the middle of the mounting ring, and the luminous bodies are mounted to the mounting part and are connected to the receiving coil via a connecting wire; the permanent magnet is an assembly of magnets, of which the lower end is a cylindrical magnet, and the upper end is several overlapped circular magnets; the middle of the receiving coil is provided with a through hole corresponding to the cylindrical magnet of the permanent magnet; the lower case is provided with a fixing pillar corresponding to the cylindrical magnet, and the middle of the fixing pillar is provided with a fixing hole; the cylindrical magnet passes through the through hole of the receiving coil, and then is inserted into the fixing hole; the permanent magnet is fixed at the lower end of the lower case; the receiving coil is sleevingly arranged to the outer side of the cylindrical magnet.

2. The magnetic suspension device of claim 1, wherein the suspension body is a hollow sphere, an ornament, a toy, a lamp or a furnishing.

3. The magnetic suspension device of claim 1, wherein a transmitting circuit board is arranged inside the magnetic base, and the transmitting circuit board is arranged correspondingly to the transmitting coil.

4. The magnetic suspension device of claim 3, wherein an annular ferrite is arranged inside the magnetic base; a plurality of suspension system coils, a plurality of magnetic heads embedded in the suspension system coils, and a magnetic suspension circuit board are arranged inside the magnetic base; the magnetic suspension circuit board is used to control the change of the magnetism of the suspension system coils and the magnetic heads; besides, a system sensor used to control the suspension of the suspension body, and a central sensor used to control the work of the system sensor are also arranged inside the magnetic base.

5. The magnetic suspension device of claim 4, wherein the side of the magnetic base is provided with a through hole, and a power converter is arranged at the through hole; the power converter is used for connecting with an external power supply to provide electricity to the magnetic suspension circuit board and the transmitting circuit board.

6. The magnetic suspension device of claim 5, wherein the magnetic base is cuboid, the lower opening of the magnetic base is provided with a base plate; a bracket is arranged in the magnetic base; the bracket comprises an upper mounting plate, a lower mounting plate, several connecting plates connecting the upper mounting plate and the lower mounting plate, and a mounting pillar connecting the middle parts of the upper mounting plate and the lower mounting plate; the middle of the mounting pillar is provided with a containing hole; the magnetic suspension circuit board and the transmitting circuit board are arranged on the base plate, and are separately located at the two sides of the bracket; the ferrite is arranged to the outer side of the connecting plates by socket joint; the system sensor is contained in the containing hole, and the central sensor is arranged at the upper end of the containing hole correspondingly to the system sensor; the transmitting coil is arranged at the upper end face of the upper mounting plate.

7. The magnetic suspension device of claim 6, wherein the upper mounting plate and the lower mounting plate are respectively provided with a plurality of upper mounting holes and lower mounting holes corresponding to the magnetic heads; the magnetic heads are respectively sheathed in the suspension system coils, and of which the two ends are respectively arranged in the upper mounting holes and the lower mounting holes.

8. A magnetic suspension device comprising a magnetic base and a suspension body; the suspension body being suspended above the magnetic base, the suspension body being provided with a receiving coil and at least one luminous body; the magnetic base being provided with a transmitting coil, the transmitting coil transmitting an AC signal to the receiving coil; the receiving coil converting the AC signal transmitted by the transmitting coil into electric energy and supplying the electric energy to the luminous body for emitting light, wherein a transmitting circuit board is arranged inside the magnetic base, and the transmitting circuit board is arranged correspondingly to the transmitting coil, wherein an annular ferrite is arranged inside the magnetic base; a plurality of suspension system coils, a plurality of magnetic heads embedded in the suspension system coils, and a magnetic suspension circuit board are arranged inside the magnetic base; the magnetic suspension circuit board is used to control the change of the magnetism of the suspension system coils and the magnetic heads; besides, a system sensor used to control the suspension of the suspension body, and a central sensor used to control the work of the system sensor are also arranged inside the magnetic base, wherein the side of the magnetic base is provided with a through hole, and a power converter is arranged at the through hole; the power converter is used for connecting with an external power supply to provide electricity to the magnetic suspension circuit board and the transmitting circuit board, wherein the magnetic base is cuboid, the lower opening of the magnetic base is provided with a base plate; a bracket is arranged in the magnetic base; the bracket comprises an upper mounting plate, a lower mounting plate, several connecting plates connecting the upper mounting plate and the lower mounting plate, and a mounting pillar connecting the middle parts of the upper mounting plate and the lower mounting plate; the middle of the mounting pillar is provided with a containing hole; the magnetic suspension circuit board and the transmitting circuit board are arranged on the base plate, and are separately located at the two sides of the bracket; the ferrite is arranged to the outer side of the connecting plates by socket joint; the system sensor is contained in the containing hole, and the central sensor is arranged at the upper end of the containing hole correspondingly to the system sensor; the transmitting coil is arranged at the upper end face of the upper mounting plate.

9. The magnetic suspension device of claim 8, wherein the upper mounting plate and the lower mounting plate are respectively provided with a plurality of upper mounting holes and lower mounting holes corresponding to the magnetic heads; the magnetic heads are respectively sheathed in the suspension system coils, and of which the two ends are respectively arranged in the upper mounting holes and the lower mounting holes.

* * * * *